Figure 1:
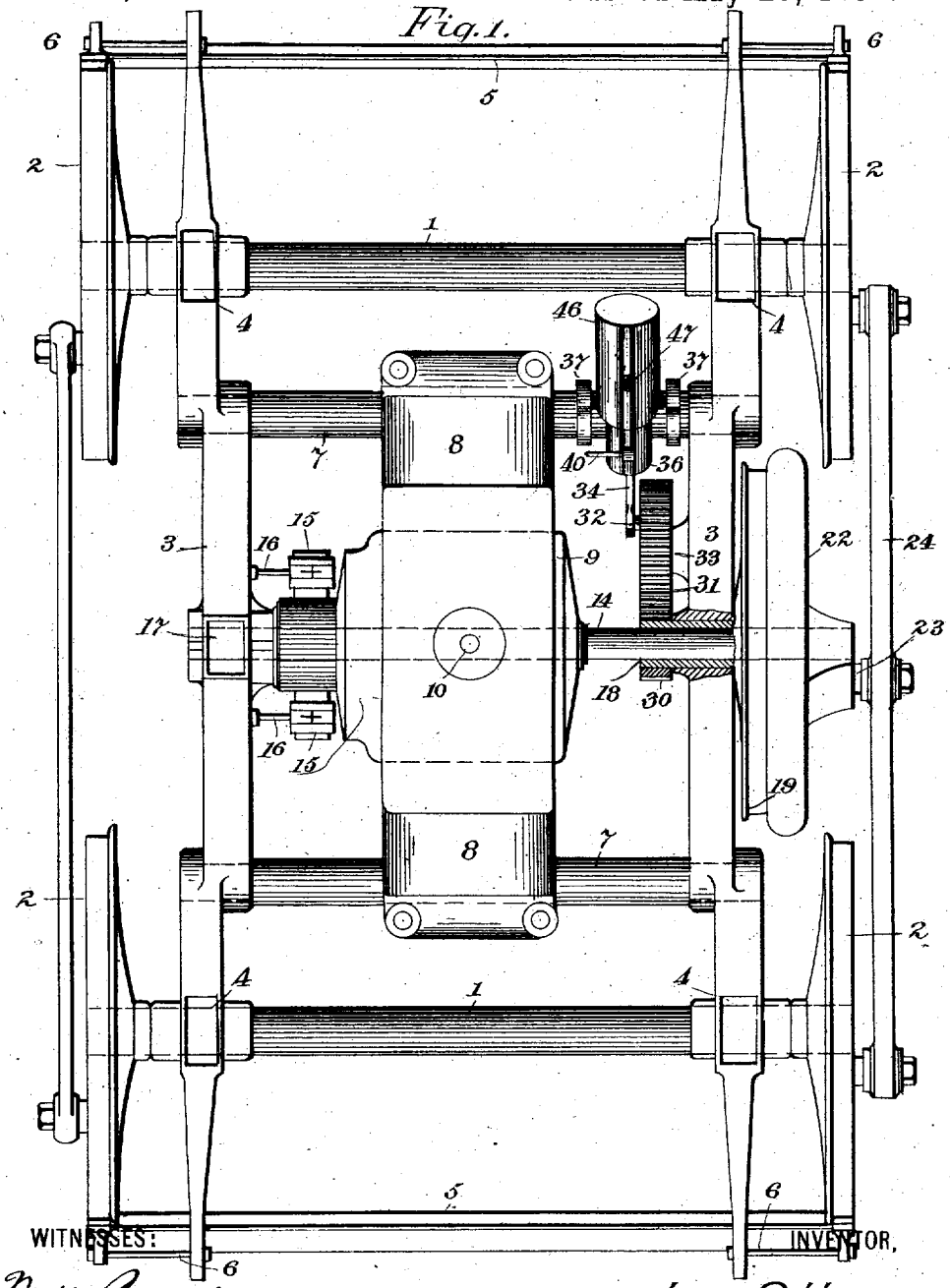
Figure 2:
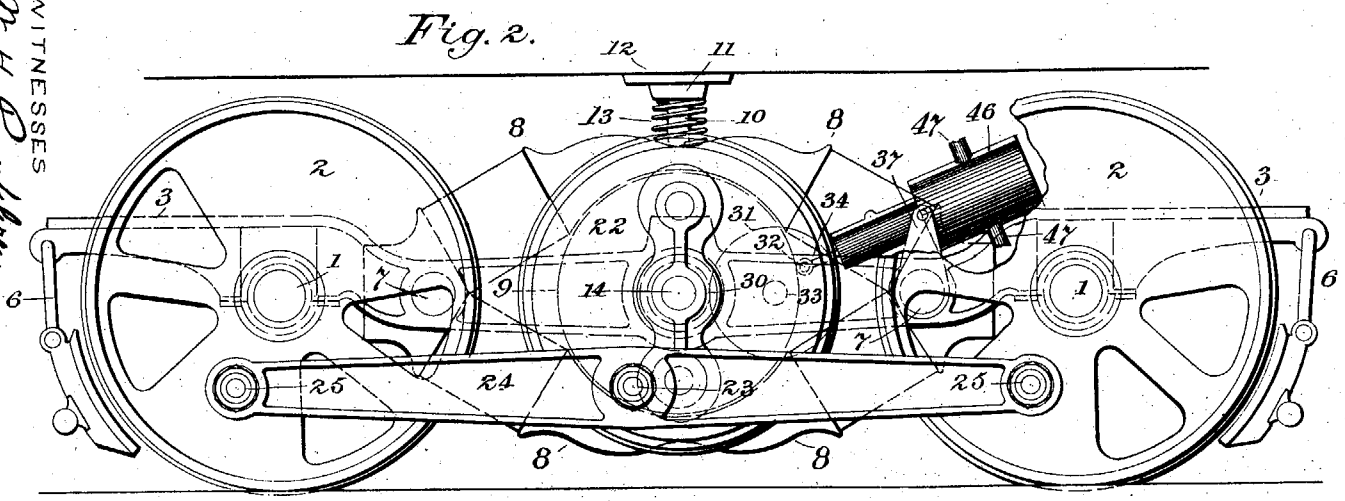
Figure 4:
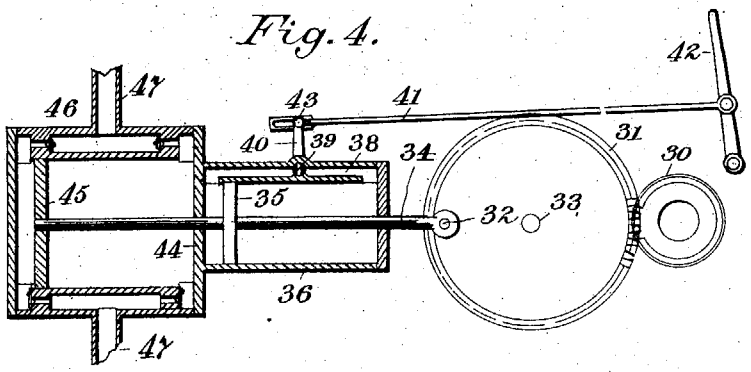
Figure 3:
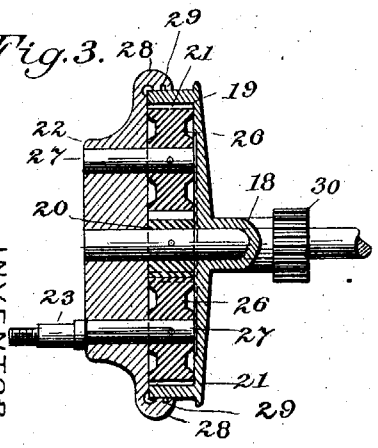
Figure 5:
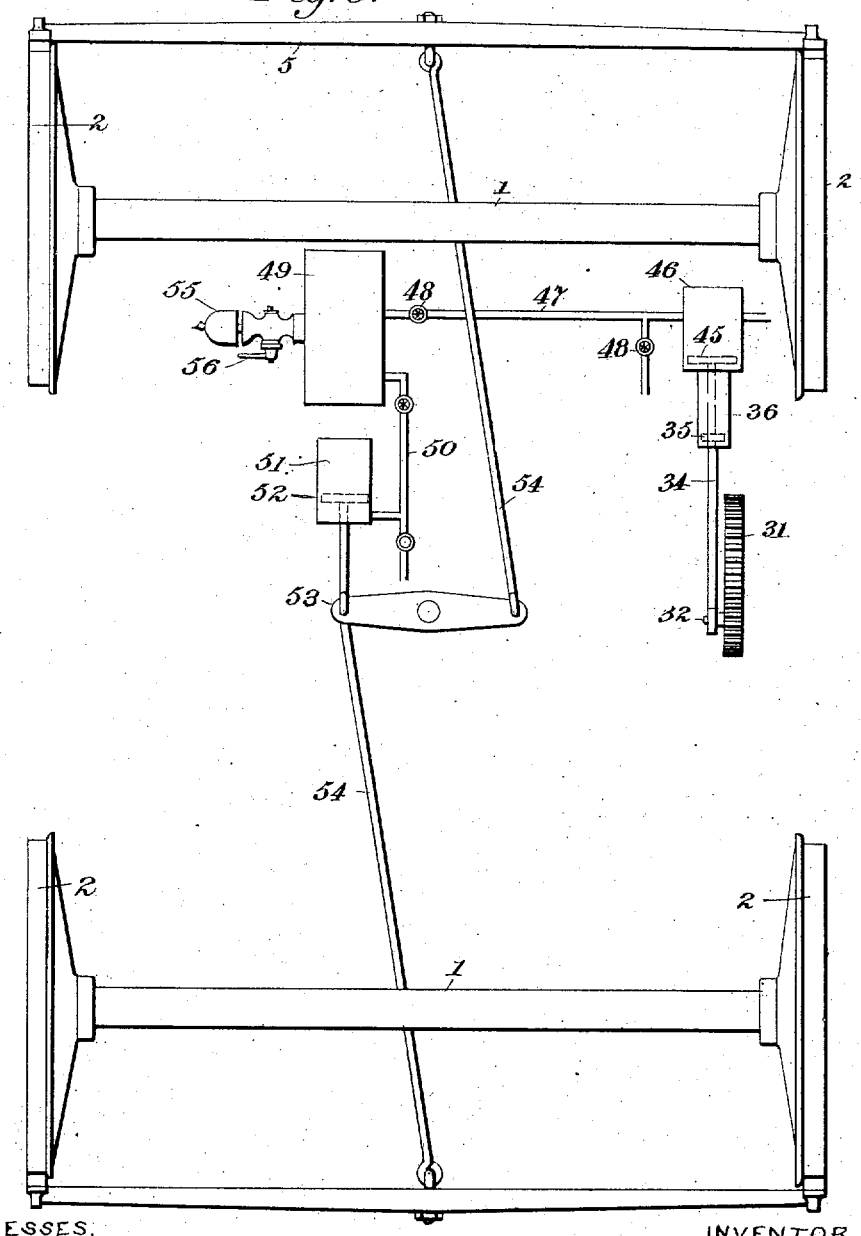

3 Sheets—Sheet 1.

J. C. HENRY.

ELECTRIC LOCOMOTIVE.

No. 11,542. Reissued May 26, 1896.

WITNESSES:

N. H. Humphrey

M. V. Bidgood

INVENTOR,

JOHN C. HENRY,

BY

Knight Bros

HIS ATTORNEYS.

THE NORRIS PETERS CO., WASHINGTON, D. C.

J. C. HENRY.

ELECTRIC LOCOMOTIVE.

No. 11,542. Reissued May 26, 1896.

WITNESSES

M. H. Pumphrey

M. V. Bidgood

BY

INVENTOR,

JOHN C. HENRY,

HIS ATTORNEYS.

THE NORRIS PETERS CO., WASHINGTON, D. C.

3 Sheets—Sheet 3.

J. C. HENRY.

ELECTRIC LOCOMOTIVE.

No. 11,542. Reissued May 26, 1896.

WITNESSES,

W. H. Pumphrey.

M. V. Bidgood

INVENTOR,

JOHN C. HENRY,

BY Knight Bros

HIS ATTORNEYS.

THE NORRIS PETERS CO., WASHINGTON, D. C.

UNITED STATES PATENT OFFICE.

JOHN C. HENRY, OF DENVER, COLORADO.

ELECTRIC LOCOMOTIVE.

SPECIFICATION forming part of Reissued Letters Patent No. 11,542, dated May 26, 1896.

Original No. 509,311, dated November 21, 1893. Application for reissue filed February 24, 1896. Serial No. 580,587.

*To all whom it may concern:*

Be it known that I, JOHN C. HENRY, a citizen of the United States, formerly of New York, N. Y., now residing at Denver, county of Arapahoe, and State of Colorado, have invented certain new and useful Improvements in Electric Locomotives, of which the following is a specification.

The present invention comprises certain improvements in the truck, the motor-supporting frame and its combination with the motor, and the power-transmitting mechanism, all of which will first be fully described with reference to the accompanying drawings, and then pointed out in the claims.

In said drawings, Figure I is a plan view of a motor-truck embodying my improvements. Fig. II is a side elevation of the same, one wheel being partly broken away to show the clutch and brake mechanism. Fig. III is an axial sectional view of the epicyclic gearing. Fig. IV is a sectional view of the clutch and brake mechanism. Fig. V is a plan of the truck with motor removed, illustrating the clutch and brake mechanism.

The invention relates to a peculiar truck, a specially-constructed motor combined therewith, and a novel arrangement for connecting the motor-shaft to the car-axles.

The axles 1 of track-wheels 2 are joined by rigid longitudinal bars 3, having inside bearings 4 on the axles. The brake-beams 5 are hung by links 6 from the projecting ends of the bars 3. Cross-bars 7 tie the longitudinal bars 3 together, and on them the field-magnets 8 of the motor are hung at their neutral points. Such field-magnets are preferably arranged elliptically, as shown, about the armature 9, providing a strong double arch. The top of the upper arch of the field-magnets bears a center pin 10, which may be cast in one with the core, and which enters a socket-plate 11 on the car-body, (indicated at 12.) The spring 13, placed between the field-magnet core and plate 11, affords a yielding support to the car-body. The weight of the car-body thus rests on the motor field-magnets and thence on the truck-frame, so that, in effect, the field-magnets form a part of such frame and add to its rigidity. The armature-shaft 14 is carried in bearings in the center of the bars 3 and midway between the axles. The commutator-brushes 15 are supported by arms or brackets 16 from one bar 3, and the support of the armature-shaft in this bar may be an ordinary boxing 17. At the other side of the truck the said shaft passes through a sleeve 18, which is formed on or rigidly fixed to the internal-gear speed-reducing gear. Such gear comprises the internal gear 19, in which the armature-shaft turns freely, and which itself turns by its sleeve 18 in its bearing in the bar 3; the pinion 20, keyed or pinned to the armature-shaft in the plane of the teeth 21 of gear 19; the disk 22, free on the end of the armature-shaft and bearing a wrist-pin 23, engaging the center of a rigid connecting-rod 24, in the ends of which engage wrist-pins 25 on the car-wheels, and intermediate pinions 26, keyed or pinned to pins 27, mounted so as to rotate in disk 22. The disk 22 has a curved flange 28 surrounding the internal gear 19, and a packing-ring 29 of any suitable material interposed between said flange and gear excludes dust from the gearing and renders it noiseless and capable of retaining lubricants.

The operation of the gearing is as follows: The armature is a constant-running one, preferably of slow speed. While the current is on, therefore, the shaft 14 and its pinion 20 revolve constantly and drive the intermediate pinions 26. If now the internal gear 19 be held fast, the intermediate pinions 26 will travel around in it, carrying with them the disk 22, its wrist 23, and the connecting-rod 24, and turning the car-wheels, so that so long as the internal gear is locked the car will move in the direction of rotation of the armature. I characterize this arrangement of the internal gear and the means whereby it may be held fast or let run free as a "slip-support," the idea being that the internal gear may be fixedly held or allowed to run freely on its support or to slip thereon under any desired regulatable frictional resistance.

The means for holding the gear fast or allowing it to run free is what I refer to in the claims as a "yielding liquid abutment," and as herein illustrated it comprises an oscillating cylinder adapted to contain water and having a return-passage between its ends, a piston in said cylinder, and a valve, manually controllable, in said passage for arresting more or less or allowing free motion to the said liquid.

To hold the gear and release it as much as and when desired, I have shown in my application, Serial No. 473,583, filed May 9, 1893, a clutch and friction-brake apparatus. In the present one I adapt to this use a liquid clutch, which may or may not be combined, as herein shown, with an air or vacuum brake for stopping the car. Said liquid clutch comprises a pinion 30, keyed to the sleeve 18 of the internal gear; a spur-wheel 31, having wrist 32 and running on a stud or pin 33, projecting from one of the bars 3; a plunger-rod 34, having one end pivoted on said wrist and bearing on the other a plunger 35; a cylinder 36, in which said plunger plays, hung so as to oscillate in brackets 37 or other support on the truck-frame and having a gate-way or by-path 38 connecting its opposite ends; a valve 39 in said path controlled by an arm 40, which is connected by rod 41 with a lever or levers 42 on one or both car-platforms.

Any suitable arrangement may be adopted to prevent the oscillation of the valve 39 in the by-path in synchronism with the oscillation of the cylinder. In order that said valve may move with the cylinder in its oscillations and may nevertheless be shifted by movement of the lever or levers 42, the connection of the rod 41 to the arm 40 may, for example, be by pin and slot 43, as shown. By shifting one of the levers 42 the valve 39 may be either opened or closed. If opened, free passage is allowed through the by-path for the liquid, which fills the cylinder and by-path, and the movement of the plunger will not be materially resisted by the liquid. The rotation of the train of gears and pinions 20, 26, 19, 30, and 31 under the action of the armature will be free and unresisted, so that the armature will turn and actuate such train of gears without driving the car; but if by the shifting of one of the levers 42 the valve 39 be closed the flow of the liquid is arrested, stopping the movement of the plunger and locking the train of gears 19, 30, and 31, so that, as before stated, the intermediate pinions 26, traveling on the internal gear 19, will carry with them the disk 22 and its accompanying reciprocating connection with the car-wheels, thus propelling the car at the full speed corresponding to the maximum speed of rotation of the armature. It will be seen that opening the valve stops the movement of the car and allows the armature to operate continuously. Closing the valve moves the car with a fixed connection. Between these two extremes any desired speed of movement of the car is attained by a corresponding opening of the valve and removal therefore of resistance to the movement of the plunger. I describe this variable lock or clutch for my differential gear, and hereinafter refer to it in the claims as "a yielding liquid abutment." In connection with this yielding abutment (and preferably actuated by the rigid connection therewith herein shown) is an air or vacuum brake, which I will now describe. In this connection it is noted that for the reason that it is desirable that both the air-pump of the brake system and the plunger of the yielding abutment be driven at slow speed so as to act most efficiently and with less friction, the pinion and gear 30 and 31 are made preferably of the proportions herein shown—that is to say, the gear 31 is made of a size larger than the pinion 30, corresponding to the reduction in speed desired.

In the application of my brake herein shown the plunger-rod 34 is continued through the end 44 of the cylinder 36 and bears the plunger 45 of the air-pump 46, which has usual connecting-pipes 47, (controlled by valves 48,) with reservoir 49, valved pipe 50, and brake-cylinder 51. The plunger 52 of such brake-cylinder is connected to brake-lever 53, which is hung from any suitable part of the car or truck, and has usual rods 54, connected to the brake-beams 5. Connected to the reservoir 49 I place a whistle 55, which is under the control of valve 56 at the motorman's hand on either platform of the car. Seeing that the plunger 45, with its positively-connected mechanism, is in this device only in action while the car is standing still or moving at reduced speed, it is only at such times that energy is absorbed in operating the air-pump of the brake system.

Although I have described and illustrated in this application my improved planetary power-transmitting and speed-reducing mechanism, the liquid and air-pump regulating devices, and the air-brake system, I have not made claim to these improvements in my present case, but have claimed them partly in my pending application, Serial No. 461,928, filed February 11, 1893, partly in application, Serial No. 473,583, filed May 9, 1893, and partly in my divisional reissue application, filed of even date with my present case.

Having thus described my invention, the following is what I claim as new therein and desire to secure by Letters Patent:

1. In combination with the wheels and axles of a car-truck, a frame uniting said wheels and a motor resting by its field-magnets on said frame, and having a bearing on its field-magnets intermediate of their support on the axles adapted to receive the weight of the car-body.

2. In combination with the wheels and axles of a truck, a frame supported on said axles by rigid bearings, a motor having its field-magnets supported on said frame and having on said field-magnets intermediate of their ends a bearing adapted to receive the weight of the car-body.

3. In combination with the wheels and axles of a car-truck, a frame supported on said axles, a motor supported rigidly on said frame by its fields and having a bearing adapted to receive the weight of the car-body.

4. The combination of the car-wheels and axles, the longitudinal truck-frame bars, the motor mounted by its field-magnets thereon and having its armature journaled therein and the brush-holders supported on brackets from one of said bars.

5. In combination with a truck, longitudinal bars forming part of the truck-frame, a motor and brush-holders for said motor supported directly by said bars.

6. The combination of the axle and wheels, the longitudinal truck-frame bars, the cross-bars of said frame supported on said longitudinal bars and the motor mounted by its field-magnets on said cross-bars said magnets having intermediate of their ends a bearing adapted to receive the weight of the car-body.

7. The combination of the car-wheels and axles, the double-arched or elliptical motor field-magnets, the frame having longitudinal bars supported on said axles and supporting said field-magnets, the armature occupying the space between the double arch of the field-magnets 6 journaled in said bars, and the car-body resting on said field-magnets, intermediate of their end supports.

8. The combination of the car-wheels and axles, the arch-shaped motor field-magnets supported thereon and the car-body supported by the arch of said field-magnets.

9. The combination of the car-wheels and axles, the double-arch-shaped motor field-magnets supported thereon and the car-body resting on the arch of said field-magnets.

10. In combination with a car-truck, a motor having unyielding support on the axles thereof, a connecting-rod connected by unyielding bearings with the motor-shaft and with the axles at one side and a connecting-rod uniting the car-wheels at the other end of the said axles without other connection with the motor-shaft.

JOHN C. HENRY.

Witnesses:
MARY HAMPTON LLOYD,
JAMES A. KILTON.